US006857119B1

(12) United States Patent
Desai

(10) Patent No.: US 6,857,119 B1
(45) Date of Patent: Feb. 15, 2005

(54) TECHNIQUES FOR MODIFYING A COMPILED APPLICATION

(75) Inventor: Sachin Desai, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 579 days.

(21) Appl. No.: 09/965,334

(22) Filed: Sep. 25, 2001

(51) Int. Cl.[7] .............................................. G06F 9/45
(52) U.S. Cl. ...................... 717/145; 717/140; 717/141; 717/146; 717/148; 717/158
(58) Field of Search .................................... 717/126, 127, 717/130, 131, 140, 139, 145, 141, 146, 148, 158; 712/209, 211

(56) References Cited

U.S. PATENT DOCUMENTS

| | | | | |
|---|---|---|---|---|
| 4,425,618 A | * | 1/1984 | Bishop et al. ............... | 712/226 |
| 6,071,317 A | * | 6/2000 | Nagel .......................... | 717/128 |
| 6,128,771 A | * | 10/2000 | Tock et al. ................... | 717/111 |
| 6,324,687 B1 | * | 11/2001 | Beadle et al. ................ | 717/148 |
| 6,351,843 B1 | * | 2/2002 | Berkley et al. .............. | 717/128 |
| 6,460,177 B1 | * | 10/2002 | Lee .............................. | 717/146 |
| 6,463,578 B1 | * | 10/2002 | Johnson ....................... | 717/124 |
| 6,463,582 B1 | * | 10/2002 | Lethin et al. ................ | 717/158 |
| 6,481,008 B1 | * | 11/2002 | Chaiken et al. ............. | 717/158 |
| 6,484,313 B1 | * | 11/2002 | Trowbridge et al. ........ | 717/146 |
| 6,529,862 B1 | * | 3/2003 | Mann et al. .................. | 703/26 |

OTHER PUBLICATIONS

TITLE: Resource–Sensitive Profile–Directed Data Flow Analysis for Code Optimization, author: Gupta et al, IEEE, 1997.*

* cited by examiner

*Primary Examiner*—Chameli C. Das
(74) *Attorney, Agent, or Firm*—Brian D. Hickman; Hickman Palermo Truong & Becker LLP

(57) ABSTRACT

Techniques for automatically modifying behavior of a compiled application include receiving a first set of compiled instructions for the application. The first set of compiled instructions is modified to generate a modified set of compiled instructions. Modifying the first set of compiled instructions includes inserting a new set of one or more instructions for invoking a first routine that provides new behavior. The first routine is not part of the first set of compiled instructions. These techniques allow an administrator to automatically instrument compiled code of an application to provide new behavior for the application without taking the application offline for substantial periods of time. In particular, the techniques allow a service provider to automatically instrument existing applications, components, and sub-components to measure and respond to server-side performance without taking the applications offline.

55 Claims, 8 Drawing Sheets

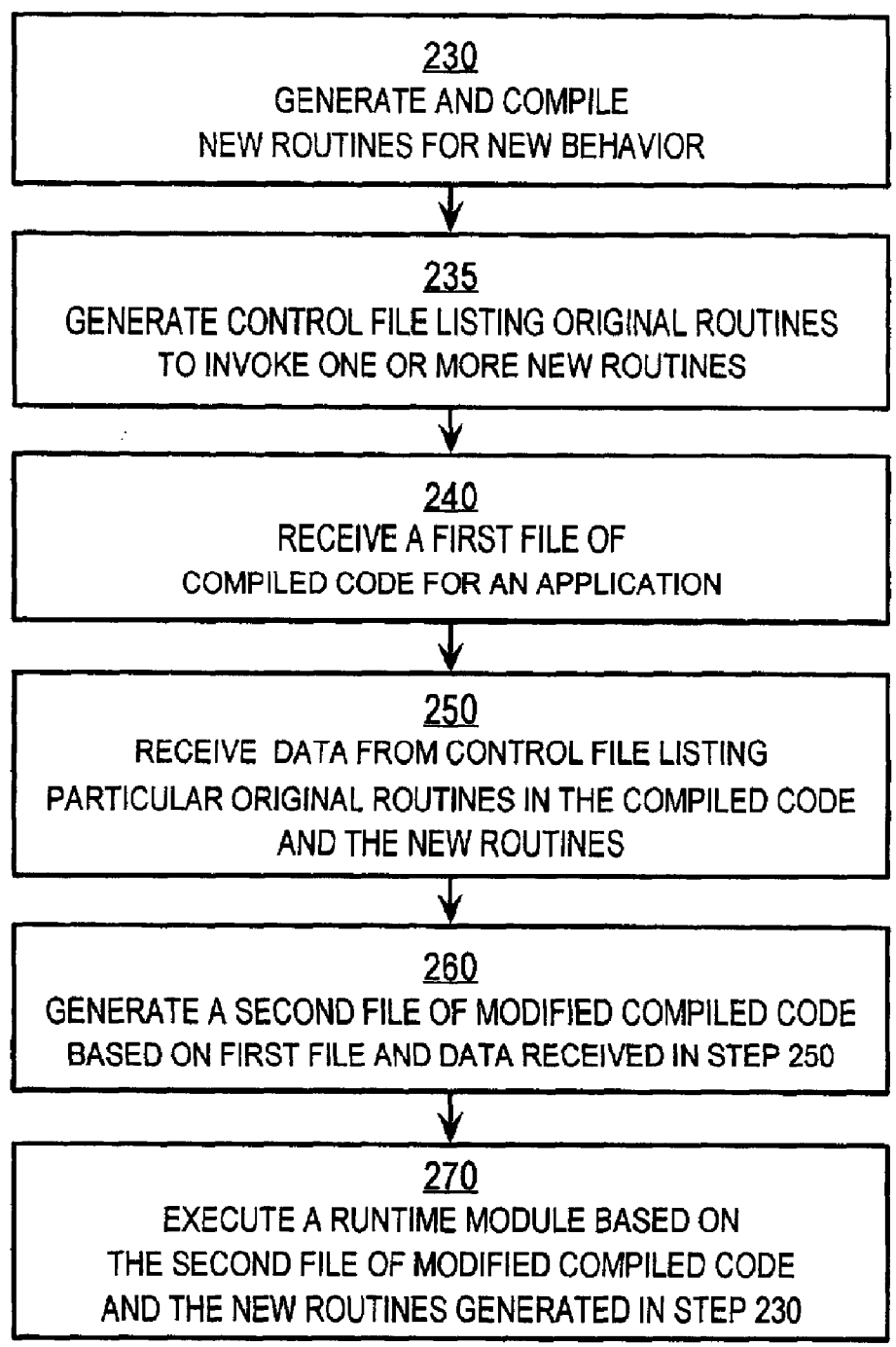

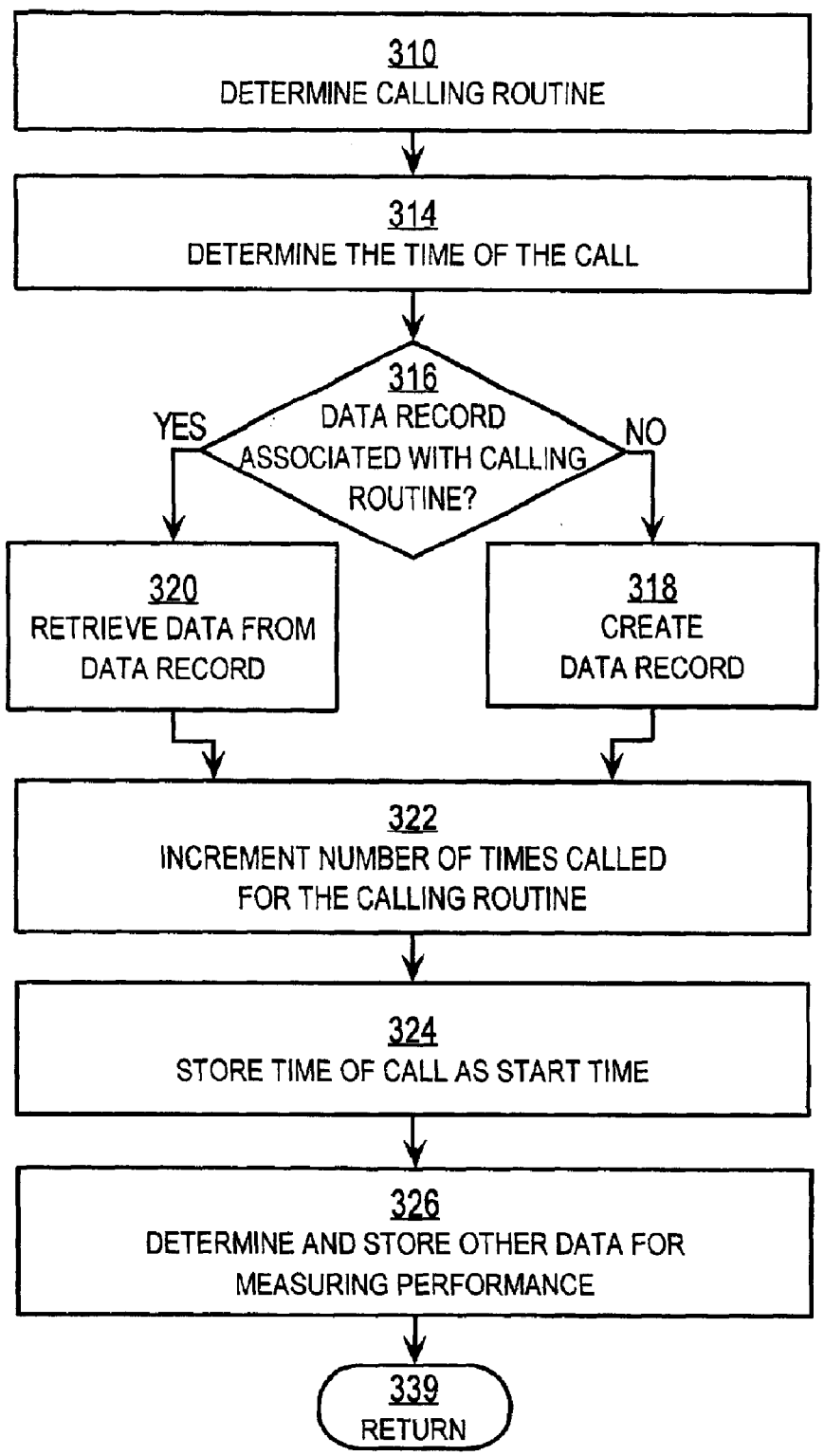

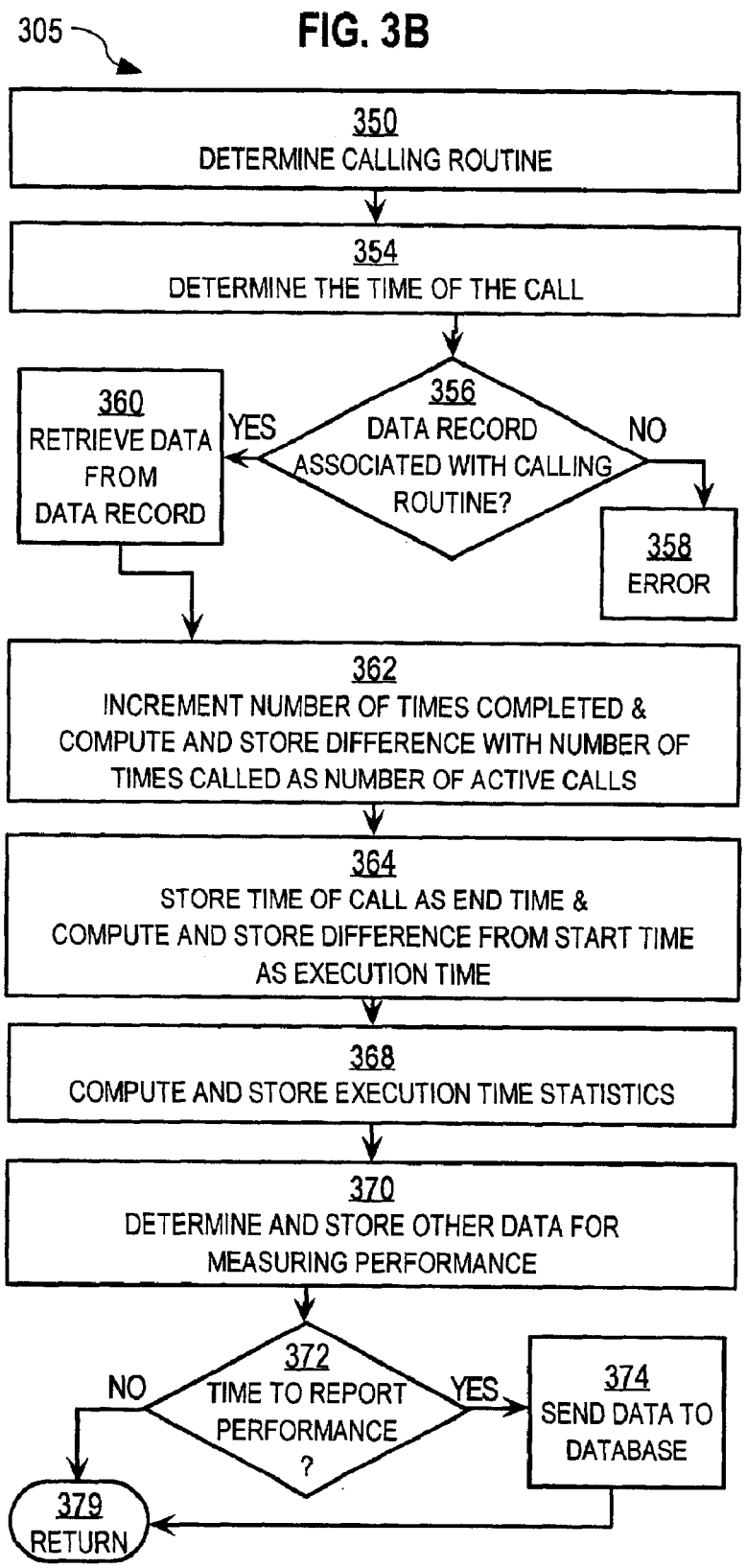

TECHNIQUES FOR MODIFYING A COMPILED APPLICATION

FIELD OF THE INVENTION

The present invention relates to modifying the behavior of a compiled application, and, in particular, to inserting a runtime monitor of website performance into an existing website application.

BACKGROUND OF THE INVENTION

Many enterprises expect to use the Internet to reach far-flung agents and customers. The Internet is a public network of computer networks, each with one or more nodes. The Internet uses open, standard protocols for addressing nodes and passing information from one node to another. A client application program (a client process) running on the user's computer (client device) interacts with a server application program (a server process) running on a different computer (server device) on the Internet. The client process initiates communication with a request sent to the server device for service from the application program. The application responds by performing some service including sending some content back to the client process. As used hereinafter, a server refers to the server process and a client refers to the client process unless otherwise indicated to refer to the node or device on which the process executes.

The World Wide Web (the Web) is a collection of services available over the Internet, which are provided by various servers and that can be accessed by a particular client called a web browser using a hyper-text transfer protocol (HTTP). Using a web browser, a user can select a service on the Web, identified by its Universal Resource Locator (URL) name, and have that service provided to the user in the form of actions performed by the server and the content returned to the client. The content includes one or more hyper-text markup language (HTML) pages. The content returned usually includes textual information and often includes graphical, video and audio elements. The location on the network associated with a URL is called a website.

Modern architectures for websites often employ mid-tier server devices. Typically, the mid-tier server devices will run a web server and an application. The mid-tier application is a server-side application, rather than a client-side application (such as a web browser). The web server handles requests from clients and provides static content for the services provided by the website. The application provides any dynamic processing for the services provided by the website.

Many applications use a database server to manage data. When responses to client requests depend on data in the database, the application sends database requests to one or more database servers on one or more devices in a database layer. This architecture improves scalability by insulating the database servers from high numbers of concurrent users, to some degree. More users can often be accommodated by more devices and more web servers in the mid-tier.

Certain types of components have become popular, and are used by many mid-tier applications. For example, websites for retailers often rely on a credit card payment component and a shopping cart component in their mid-tier applications. A shopping cart component supports a user purchasing items available through the website. A shopping cart component presents a user with a graphical interface that behaves like a shopping cart in a grocery store. The user selects one or more items offered by the retailer, and adds them to the cart. The user may undergo a change of heart and remove one or more items. Only after the user has decided on the items to be purchased does the user go through the payment component of the application. The shopping cart component is popular with users because the shopping cart component allows the user to avoid repetitious entry, e.g., entry for every item selected, of data such as user name, shipping address, billing address and credit card or account information associated with the payment component.

Many retailers would prefer not to develop their own shopping cart component, payment component and other components of a retail website if ready-made, tested components can be purchased or licensed from third parties at a fraction of the development costs to the retailer.

Problems may arise with the use of third-party components in mid-tier applications. The components are often not engineered for the particular hardware, operating system and network architecture environment of the website being provided. Thus, some of the applications, components, or sub-components may perform poorly, leading to an unpleasant user experience and increased risk of losing potential customers. A website provider therefore is interested in monitoring the performance of third-party applications, components and sub-components so that problem applications, components or sub-components can be identified, bypassed, or reported to the third party that provided them for corrective modifications.

However, the ability of a website provider to monitor components and sub-components is hindered by a lack of tools that provide the desired information. Performance tools are often not provided for each sub-component, and, if provided, are not expected to be consistent among different third parties.

A debugger option may be employed to gather some performance information for some applications or components. A debugger option allows a human to monitor the state of the application at each instruction in the code.

However, the compiled code provided by the third party is often production code that does not include a debugger option. An application with a debugger option consumes extras computer processing and storage space compared to an application without the debugger option. To conserve such system resources, third-party components are often distributed without a debugger option.

Even if a debugger is present, the performance check is manual, tedious to perform, and may involve taking the component off-line; thus, making the website unavailable for its intended purpose for some period of time.

In addition, it is difficult for a website administrator, acting for the website provider, to insert instructions for computing performance. Often, the software provided by the third party is not source code but compiled code, such as Java bytecode, that is not easily read or written by a human website administrator. Also, inserting instructions often entails making the website unavailable for a substantial period of time.

Even if the source code is available, or the website administrator reads and writes in the language of the compiled code, or both, the website administrator may lack the knowledge of the component or sub-component functionality helpful for determining what instructions to insert and where to insert them. Also, such insertions again entail making the component, and hence the website, unavailable for potentially substantial periods of time.

Even if the website administrator has the knowledge to make the changes, such as for an application developed by the website administrator, the process is manual, tedious, and can lead to all or part of the mid-tier application being offline for substantial periods of time.

Based on the above, there is a clear need for techniques that allow an administrator to automatically instrument compiled code of an application to provide new behavior for the application.

Furthermore, there is a need for the new behavior to be provided without taking the application offline for substantial periods of time.

In particular, there is a need for techniques that allow a service provider to automatically instrument existing applications, components, and sub-components to measure and respond to server-side performance without taking the applications offline.

SUMMARY OF THE INVENTION

Techniques for automatically modifying behavior of a compiled application are provided. According to one embodiment, the techniques include receiving an original set of compiled instructions for the application. The original set of compiled instructions is automatically modified to generate a modified set of compiled instructions. The automated step of modifying the original set of compiled instructions includes automatically inserting into the first set of compiled instructions a new set of one or more instructions for invoking a first routine that provides new behavior.

In one use of the technique, the application may be, for example, a component provided by a third party for use at a website. The first routine may be, for example, a routine for monitoring the performance of the application. Thus, insertion of instructions for invoking the routine allows a website administrator to easily monitor the performance of the third party component.

According to another aspect of the invention, techniques for automatically monitoring performance of a compiled application include inserting, into an original set of compiled instructions, a first set of one or more instructions for invoking a first routine. The first set of instructions is inserted at a position within the original code that is associated with entering a particular routine that exists in the particular code. Generating the modified set also includes inserting a second set of one or more instructions that invoke a second routine. The second set is inserted in at a position associated with exiting the particular routine. The modified set of compiled instructions causes a processor to invoke the first routine when entering the particular routine, and to invoke the second routine when exiting the particular routine.

According to another aspect of the invention, instructions are inserted, as described above, at the beginning and end of various routines that are in the original code, based on data that indicates which routines of the original code should be monitored.

The techniques include executing a runtime module based on the modified set of compiled instructions. Executing the runtime module causes a processor to invoke the first routine when entering the particular routine. The first routine accumulates first data associated with the particular routine. The first data may indicate any number of performance-related statistics, such as the number of times the particular routine is called and a start time for the particular routine.

Executing the runtime module also causes a processor to invoke the second routine when exiting the particular routine. The second routine accumulates second data associated with the particular routine. The second data may indicate, for example, the number of times the particular routine has completed, the number of active calls to the particular routine that have not completed, an end time for the particular routine, an execution time, an average execution time, a minimum execution time, and a maximum execution time.

The execution time is based on a difference between the start time and the end time. The second routine records data about performance based on the first data and the second data according to a particular schedule. The schedule is based on a time when the second routine is invoked.

These techniques allow an administrator to automatically instrument compiled code of an application to provide new behavior for the application without taking the application offline for substantial periods of time.

In particular embodiments, the techniques allow a service provider to automatically instrument existing applications, components, and sub-components to measure and respond to server-side performance without taking the applications offline.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a flowchart illustrating, at a high level, a method for automatically modifying behavior of a compiled application, according to an embodiment;

FIG. 3A is a flowchart illustrating a method performed by a first routine for measuring performance, according to an embodiment;

FIG. 3B is a flowchart illustrating a method performed by a second routine for measuring performance, according to an embodiment;

DETAILED DESCRIPTION OF THE PREFERRED EMBODIMENT

Techniques for server-controlled measurement of performance based on modifying compiled modules are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Overview of Structural Elements

Figure 1A:
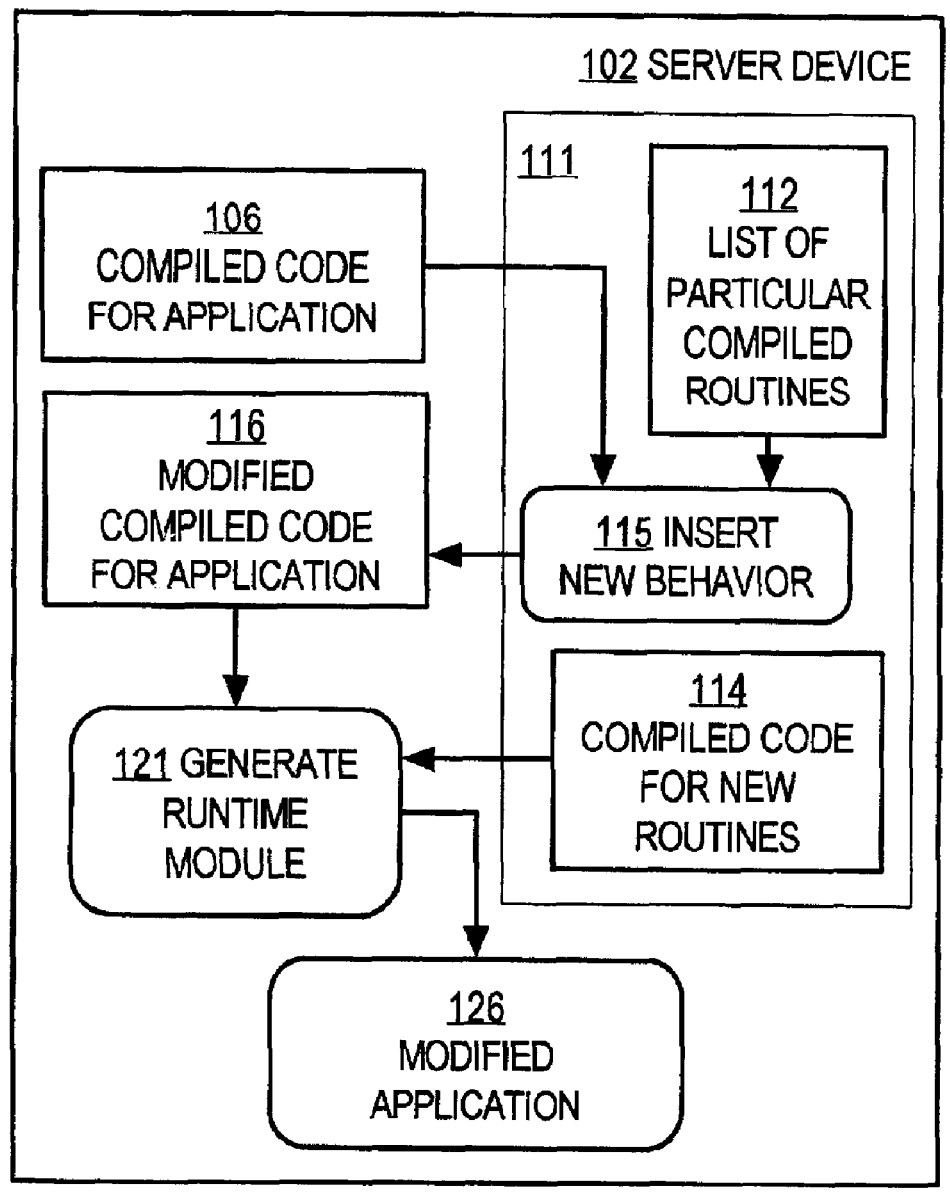
FIG. 1A is a block diagram illustrating a tool for modifying compiled code for an application, according to an embodiment.
Figure 1B:
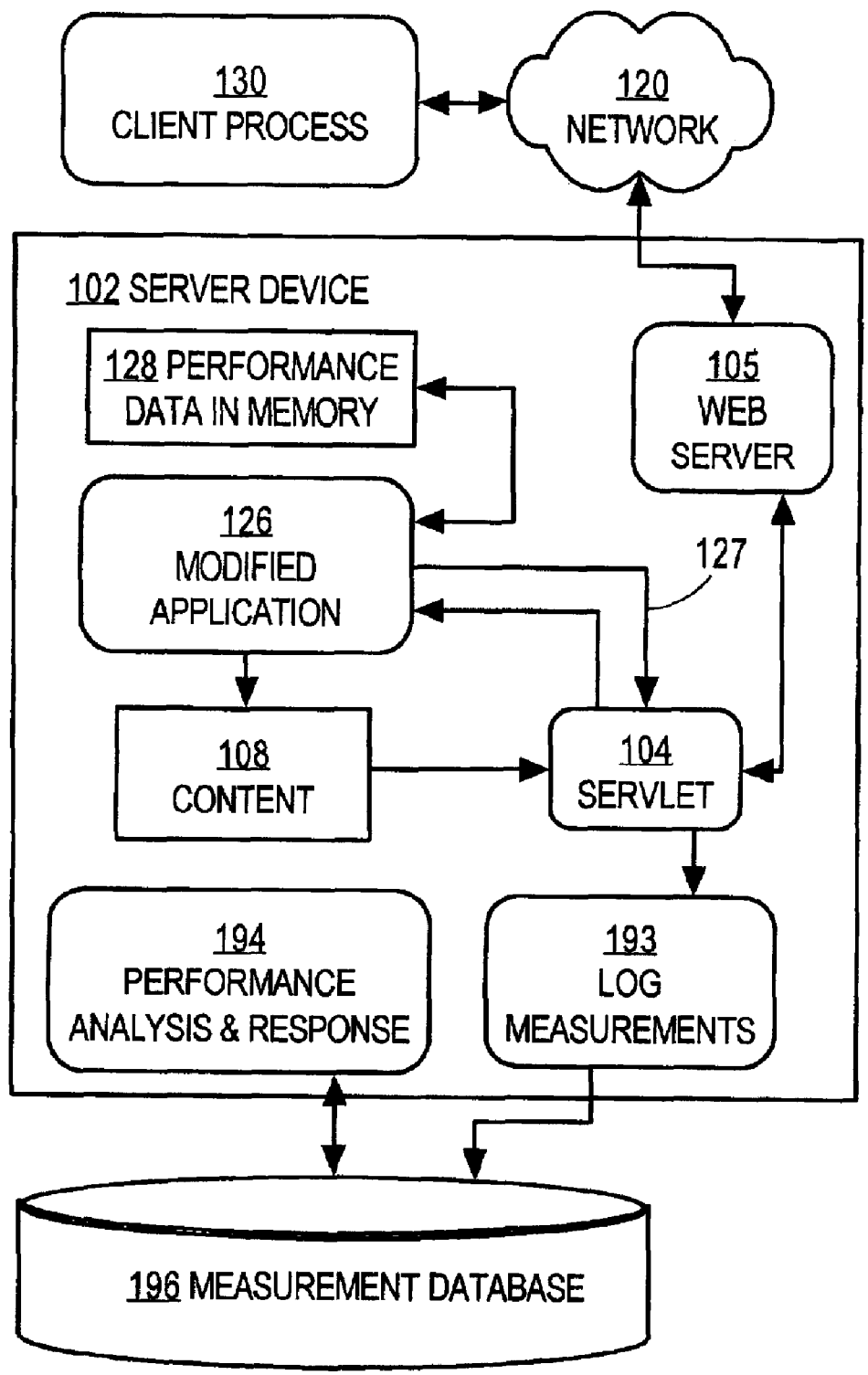
FIG. 1B is a block diagram illustrating operation of a modified application for measuring server-side performance, according to an embodiment.

The structural elements and the processes that act on them according to some embodiments of the invention are depicted in FIG. 1A and FIG. 1B.

FIG. 1A is a block diagram illustrating a tool 115 for modifying compiled code for an application, according to an embodiment. Tool 115 modifies the compiled code by automatically inserting instructions into the compiled code, where the inserted instructions make calls to routines that are not in the original compiled code.

As shall be described in greater detailed hereafter, the instructions may be inserted to cause specific routines within the original code to be monitored during runtime operation of the application. When instructions are inserted to monitor, circumvent, or modify the behavior of an existing routine, the existing routine is said to be the "target" of the inserted instructions. The routines that are the target of the inserted instructions are referred to herein as "target routines".

The structures are shown in FIG. 1A on a server device 102, such as on a mid-tier server. In other embodiments, the structures shown in FIG. 1A are distributed on one or more computing devices on a network, or in a stand-alone computing device. Original compiled code 106 for an application is stored on server device 102. For example, compiled code 106 is stored in one or more files on a persistent storage device.

Compiled code 114 implements new routines (routines that are not in the original compiled code 106). When added to an application, the routines in the compiled code 114 provide the new behavior for the application. The routines that are added to an application to provide new behavior for the application are referred to herein as "modification routines". As shall be described in greater detail hereafter, the modification routines may be added to an application by inserting instructions into the original compiled code 106 of the application. The compiled code 114 that contains the modification routines is stored on server device 102 in the form of one or more files on a persistent storage device.

In one embodiment, there are only two modification routines, a first new routine invoked when a target routine is entered, and a second new routine invoked when a target routine is exited. For one embodiment, the two new routines are described in more detail below with reference to FIG. 3A and FIG. 3B. In other embodiments, there are fewer or more new routines.

As depicted in FIG. 1A, a system 111 of structures for modifying behavior of a compiled application includes the compiled code 114 for the modification routines, the control file 112, if any, and the insert-new-behavior process 115. With system 111 in place, modified compiled code 116 is automatically generated based on the original compiled code 106, and the modified application 126 is automatically generated from the modified compiled code 116.

JAVA Embodiment

In one embodiment, the original compiled code 106 is made up of one or more JAVA class files containing bytecode for a shopping cart component and a payment component used by a retailer's website. For the purpose of explanation, it shall be assumed that the bytecode has been generated by a third party and includes no options for reporting performance and no hooks for calling routines to measure performance.

JAVA bytecode is produced by JAVA compiler operating on JAVA language statements, where the JAVA statements are generated by an application developer. JAVA bytecode for a particular application is the same for every computer platform. A particular computer platform is made up of a particular type of hardware processor and a particular operating system. The JAVA bytecode is therefore platform independent. The JAVA bytecode is interpreted by a process called JAVA Virtual Machine (JVM) that is specially written for a particular computer platform. The bytecode in a class file defines the software object types, each software object type comprising one or more attributes and one or more routines called methods.

In the examples given below, the compiled code is JAVA bytecode. In other embodiments, the compiled code, such as the original compiled code 106, comprises object files derived by compiling source code that is written in other programming languages. Many object files are platform specific. Object files for use on a particular platform are derived from code written in a particular programming language using a compiler process that is specific for that particular programming language and computer platform.

Examples of programming languages include FORTRAN, Pascal, C, C++ and JAVA Object files use relative addresses for memory locations where instructions and data are stored. Runtime code executed directly by a processor on a computing device is formed by linking one or more object files together and converting relative memory locations to actual memory locations.

For the purpose of explanation, it shall also be assumed that the compiled code 114 that contains the modification routines is made up of one or more JAVA class files containing bytecode that implements modification routines for measuring performance.

The Control File

A control file 112 contains a list of references to one or more of the target routines in the original compiled code 106. A target routine can be referenced by its name and the name of the application that includes the original routine. In some embodiments, the target routines are not listed explicitly but are indicated by symbols representing a range of several original routines. For example, target routines can be listed implicitly using "wildcard" characters well known in the art for names of objects. For example, one symbol indicates that all original routines in the original compiled code 106 are to be target routines.

In some embodiments, the control file 112 specifies which modification routines are to be used to monitor, modify or circumvent the behavior of each of the target routines. When the same modification routines are going to be applied to all of the target routines, the modification routines do not need to be explicitly associated with the listed target routines. Under these circumstances, the modification routines are implicitly associated with each of the target routines. In some embodiments, in which all modification routines are associated with every original routine, the control file 112 can be omitted.

In some embodiments, the control file 112 includes data indicating a particular statement within a target routine, with which a modification routine is to be associated. Such embodiments are more likely when the website administrator is more knowledgeable about the contents of the original routines than is expected when the original routines are provided by a third party.

The data indicating the list of target routines in control file 112 can be expressed in any manner. For example, in one embodiment, the control file 112 lists target routines as coded text in a preordained order. In some embodiments, a mark-up language is used to distinguish and associate target routine names and modification routine names, when present. For example, in some embodiments, the HyperText Markup Language (HTML) is used; and, in other embodiments, the extensible Markup Language (XML) is used.

Tool 115

Insert-new-behavior tool 115 is a tool that uses the information in the control file 112 and the instructions in the compiled code 106 to generate modified code 116 for the application. The tool 115 inserts sets of statements appropriate for compiled code. Each set invokes at least one of the modification routines. The statements may indicate other actions to be performed by a processor as well, such as testing for conditions, determining a state of processing according to the original application at the time the original function is invoked, and bypassing the remainder of the target routine.

An embodiment of the insert-new-behavior tool 115 is described in more detail below with reference to FIG. 4. By inserting statements in locations of the original compiled code associated with target functions, the tool effectively inserts hooks for the new behavior into code that did not provide hooks originally.

Generate-Runtime-Module Process

A generate-runtime-module process 121 is a process to produce a runtime module that may be executed directly by a processor on a server device, such as server device 102. References to the modification routines, in the sets of statements inserted into the modified compiled code 116, cause the generate-runtime-module process 121 to receive the compiled code 114 for the modification routines and incorporate that compiled code into the runtime module for the modified application 126. Conventional processes that generate runtime modules are well known and may be used for process 121. It is anticipated that most processes for generating runtime modules from compiled code, known at the time an embodiment is implemented, may be used for process 121.

The Modified Application

Modified application 126 is a process that results from executing the runtime module produced by the process 121. In some embodiments, the modified application appears to a client process to be substantially the same as the process based on the original compiled code 106. For example, in embodiments in which the new behavior is confined to computing and reporting performance measures to a website administrator, the modified application appears to a client process to be substantially the same as the process based on the original application.

FIG. 1B is a block diagram illustrating operation of a modified application for measuring server-side performance on a mid-tier server device 102, according to an embodiment.

Server Device Operation

Referring to FIG. 1B, a network 120 connects a client process 130 on a client device (not shown) with a web server 105 on server device 102. Other processes executing at one time or another on the server device 102 include a servlet 104, the modified application 126, a log-measurements process 193 and a set of one or more performance analysis and response processes 194. In other embodiments, one or more of the modified application 126, the log measurements process 193, and one or more of the performance analysis and response processes 294 execute on other devices connected to the server device 102. For example, the modified application may run on another mid-tier device, while the processes 193, 194 may execute on a device in the database layer.

The server device 102 is connected to a permanent storage device holding a measurement database 196. In some embodiments, the measurement database 196 resides on a permanent storage device included within the server device 102. In other embodiments, the measurement database 196 is on another mid-tier device or on a device in the database layer.

The server device 102 also includes a data structure holding content 108 generated by the modified application 126 for sending to the client process 130. Example content includes a web page in HTML form. The content may also appear on other mid-tier devices, such as the mid-tier device that includes the modified application 126, and on intervening mid-tier devices involved in communications between the modified application 126 and the client process 130.

The client process 130, such as a web browser, runs on a client device and makes a request for a service offered by servers on server device 102. The client process 130 communicates by sending messages over network 120 to the web server 105.

The web server 105 receives one or more requests from the client process for web services. When the request includes data indicating a service associated with the web servlet, 105, the web server invokes the servlet and sends data based on the request. The servlet 104 provides additional functions not available from a conventional web server 105 and is often written in bytecode executed by a JVM. As illustrated, servlet 104 sometimes provides calls to the modified application 126, depending on the data received from the web server 105.

According to the depicted architecture, a request for services offered by the original application is sent by servlet 104 to the modified application 126. The request goes automatically to the modified application, without modifications to servlet 104, if the modified application has the same name for the runtime module as the original application. If not already executing, the servlet executes the runtime module of the modified application before sending the request for services. The modified application 126 then generates content 108, which is returned to the servlet 104. The servlet 104 passes the content to web server 105. The web server 105 adds whatever additional content it keeps locally and sends the combined content to the client process 130 over the network 120. In other embodiments, a system architecture may be used that does not include servlet 104, but that has web server 105 communicate directly with modified application 126.

When certain original functions in the modified application 126 are invoked and executed, a call is made to one or more of the modification routines. In the embodiment illustrated below with reference to FIGS. 3A and 3B, performance data is accumulated. Each modification routine records data related to the performance of a particular original function in a data structure 128 located in memory. The data is stored in association with a reference to the particular original routine. Each modification routine retrieves information already stored in the data structure 128 in memory. At least one of the modification routines, on a predetermined schedule, reports information related to performance measures of the particular original routines to the servlet 104, as indicated by arrow 127. The servlet passes the information to the log measurements process 193. The log measurements process 193 stores the information into the database 196. The performance analysis and response processes 194 use the performance data in the measurement database 196 to determine and report problems associated with the performance of any of the original functions.

Functional Overview

FIG. 2 is a flowchart illustrating, at a high level, a method 200 for automatically modifying behavior of a compiled application, according to an embodiment. Although the steps are illustrated in FIG. 2 and the following flowcharts in a particular order, the steps may be reordered or occur at overlapping times in other embodiments.

In step 230, a website administrator generates and compiles modification routines to provide the new behavior. The resulting compiled code 114 for the modification routines is stored. Example modification routines for measuring performance are described below with reference to FIG. 3A and FIG. 3B.

In step 235, the website administrator generates a control file 112 listing the target routines that are to be modified by one or more of the modification routines. A control file is described in greater detail for some embodiments below. Step 235 may be omitted if all modification routines are invoked in every one of the original routines in the original compiled code 106.

The next three steps 240, 250, 260 in FIG. 2 are performed by the tool 115 for inserting new behavior.

In step 240, the tool 115 receives data from a first file of compiled code 106 for an application. For example, the tool 115 reads the bytecode in one or more class files for the shopping cart component and the payment component.

In step 250, the tool 115 receives data listing particular original routines and the modification routines. For example, tool 115 reads control file 112 containing XML statements indicating the modification routines to add to each of several of the original routines. Step 250 may be omitted in embodiments in which all modification routines are added to all original routines.

In step 260, the tool generates a second file containing modified compiled code 116 based on the first file of compiled code 106 and data received in step 250 from control file 112. For example, the tool 115 generates compiled code that invokes modification routines to measure performance for every original routine in the compiled code 106. An embodiment of step 260 is described in more detail below with reference to FIG. 4.

In step 270, compiled code is linked to produce one or more runtime modules. The second file containing modified compiled code 116 and the compiled code 114 of modification routines generated in step 230 are linked to form a runtime module. Also in step 270, the runtime module is executed. A process 121 generates a runtime module from the modified compiled code 116. For example, a JVM generates and executes modified runtime modules for invoked methods as needed based on the modified bytecode and the bytecode for the modification routines.

When the runtime module is executed, the modified application process 126 performs one or more steps of the original application plus one or more steps of the new behavior provided by the modification routines. For example, a runtime module is generated and executed that performs the steps of a shopping cart process and a payment process as well as the steps of measuring performance of the routines in the shopping cart and payment components.

In an embodiment where the modification routines simply monitor the performance of the target routines, a user sees only the original behavior of the shopping cart and payment components. The new performance measurement process is transparent to the user. In other embodiments, the new behavior includes steps that are apparent to the user. For example, the new behavior may include issuing a sound whenever an item is added to the shopping cart.

These techniques allow an administrator to automatically instrument compiled code of an application, to provide new behavior for the application, without taking the application offline for substantial periods of time. In particular, the techniques allow a website administrator of a web service provider to automatically instrument existing applications, components, and sub-components to measure and respond to server-side performance without taking the applications offline.

New Behavior For Measuring Server-Side Performance

FIG. 3A is a flowchart illustrating a method 301 performed by a first modification routine for measuring performance, according to an embodiment. The first modification routine accumulates data when a target routine is entered. The data thus accumulated may be used in measuring performance of the target routine. The first modification routine is hereinafter called the DataOnEnter routine.

In step 310, the name of the calling routine is determined. The name of the calling routine, assumed to be "Omethod1" for purposes of illustration, may be determined in any manner known in the art when method 301 is implemented. For example, in one embodiment, an operating system provides the name "Omethod1" of the calling routine to the routine DataOnEnter. The operating system may provide the name "Omethod1" automatically, or in response to a call to an operating system function. In another embodiment, as described below, the name of the calling routine is passed as a parameter to the DataOnEnter routine by the instructions inserted into the Omethod1 routine.

In step 314, the current time when the DataOnEnter routine is called is determined. The time may be determined in any manner. For example, in one embodiment, a call is made to a function of the operating system to determine the time. In another embodiment, as described below, the time is passed as a parameter to the DataOnEnter routine by the instructions inserted into the Omethod1 routine. For purposes of illustration, the time is determined to be 1.111 seconds.

In step 316 it is determined whether a data structure in memory includes a record associated with the calling routine, Omethod1. If not, control passes to step 318 to generate a data record for Omethod1 and set initial values for the fields included in the data record.

Figure 3C:
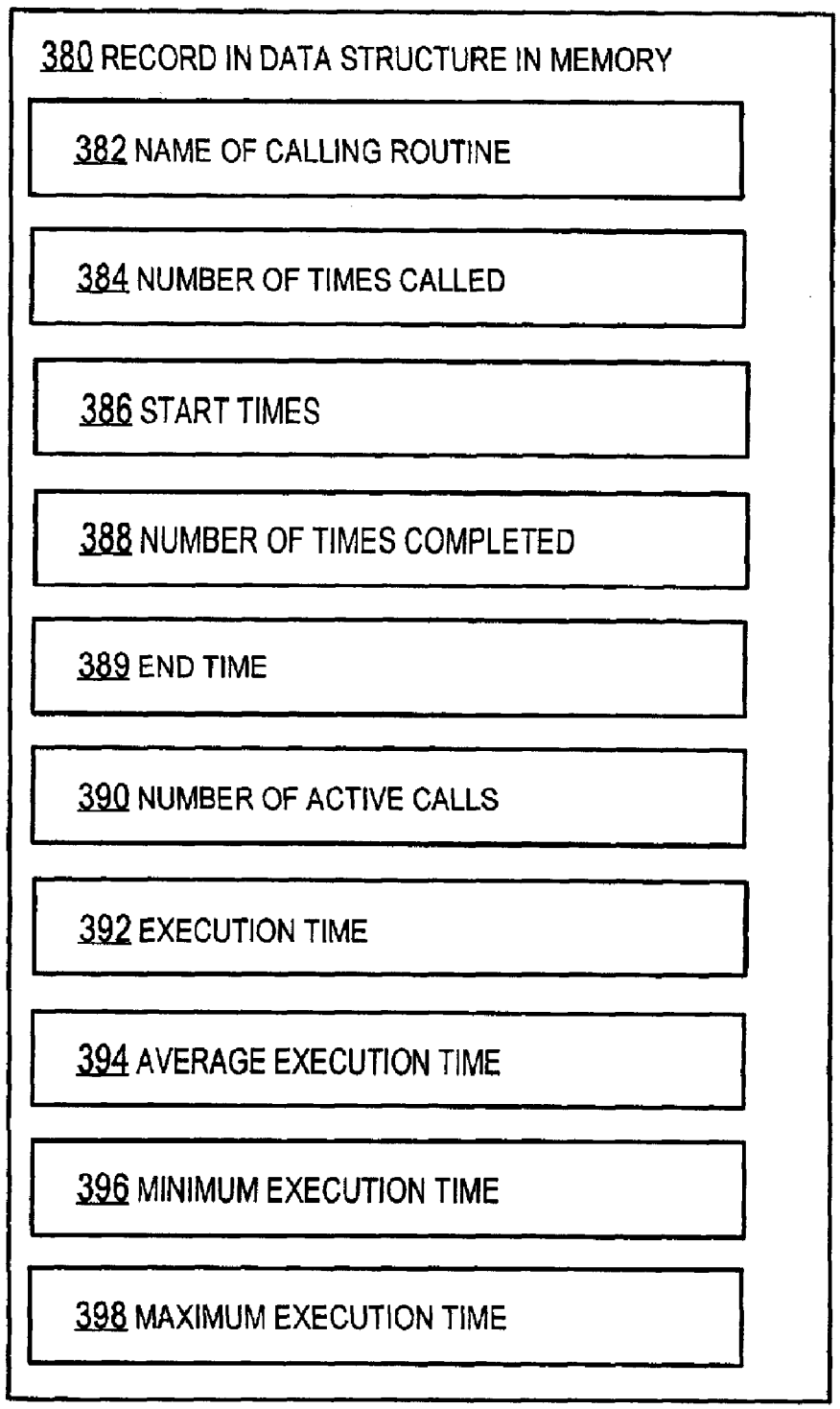
FIG. 3C is a block diagram of a record in a data structure for storing data related to performance, according to an embodiment.

FIG. 3C shows a record 380 stored in a data structure 128 in memory used by the modification routines of FIG. 3A and FIG. 3B. The record 380 includes several fields. Field 382 stores data indicating the name of the calling routine. Field 384 stores data indicating the number of times the calling routine named in field 382 has been called. Field 386 stores data indicating start times for the active calls, e.g., the calls to the routine named in field 382 that have not yet resulted in the routine named in field 382 completing all steps and returning control to another routine that called the routine named in field 382. Field 388 stores data indicating the number of times the calling routine named in field 382 has completed. Field 389 stores data indicating the most recent time the calling routine named in field 382 has completed. In other embodiments other fields related to performance are included in record 380.

The next fields in record 380 of FIG. 3C hold data derived from the preceding fields. Field 392 stores data indicating the most recent execution time for the routine named in field 382. Field 394 gives the average execution time for the completed calls to the routine named in field 382. Field 396 gives the minimum execution time for the completed calls to the routine named in field 382. Field 398 gives the maximum execution time for the completed calls to the routine named in field 382. In other embodiments other derived fields are included in record 380. For example, a sum of squares of the execution times is stored in another derived field.

In step 318 of FIG. 3A, the DataOnEnter method sets initial values as follows, for example. The data in field 382 for the name of the calling routine is set based on the name determined in step 310. The data in field 384 for the number of times called is set to indicate zero times called. The data in field 386 for the start times is set to indicate an array with no elements. The data in field 388 for the number of times completed is set to indicate zero times completed. The data in field 389 for the end time is set to indicate no entry (e.g., a null value). The data in field 390 for the number of active calls is set to indicate zero active calls. The data in field 392 for the execution time is set to indicate no entry (e.g., a null value). The data in fields 394, 396, 398 for the average, minimum and maximum execution times are set to indicate no entries (e.g., null values).

If it is determined in step 316 that the data structure 128 in memory includes a record associated with the calling routine, Omethod1, then control passes to step 320. In step 320, data stored in the record is retrieved.

In step 322, the data indicating the number of times the routine Omethod1 is called, stored in field 382, is incremented by one. For example, if the data in field 382 indicates Omethod1 has been called 10 times, the data is changed to indicate 11 times.

In step 324 the data indicating the start times, stored in field 386, is set to indicate another start time having a value equal to the time determined in step 314. For example, if the array stored in field 386 has no entries, an array with one entry of time equal to 1.111 seconds, the time determined in step 314, is stored in field 386. If the array already has three elements, an array with four elements is stored in field 386. The first three elements retain the values for time and the fourth element has a time equal to 1.111 seconds, the time determined in step 314. For example, the first three elements hold data indicating start times of 0.555 seconds, 0.888 seconds, and 0.999 seconds. The first three elements indicate that the routine Omethod1 had been called three times without yet completing when the Omethod1 routine is called at 1.111 seconds. Consequently the number of active calls, when the Omethod1 routine is called, stored in field 390, is 3. In another embodiment, only the most recent start time is stored in field 386. In some embodiments, the DataOnEntry routine updates the number of active calls in field 390. In the illustrated embodiment, the second modification routine updates the number of active calls in field 390, as described in more detail below.

In step 326 data indicating other information related to performance measurement is determined and stored in record 380 associated with the original calling routine Omethod1.

In step 339, the first modification routine, DataOnEntry, returns control to the original calling routine, Omethod1.

FIG. 3B is a flowchart illustrating a method 305 performed by a second modification routine for measuring performance, according to an embodiment. The second modification routine accumulates data when an original routine is exited for use in measuring performance of the original routine. The second modification routine is hereinafter called the DataOnExit routine.

In step 350, the name of the calling routine is determined. The name of the calling routine, assumed to be "Omethod1" for purposes of illustration, maybe determined in any manner, as described above with reference to step 310.

In step 354, the current time when the DataOnExit routine is called is determined.

The time may be determined in any manner, as described above with reference to step 314. For purposes of illustration, the current time is assumed to be 1.222 seconds.

In step 356 it is determined whether a data structure 128 in memory includes a record associated with the calling routine, Omethod1. If not, an error is indicated; and, control passes to step 358 to generate any error messages and commence any recovery procedures.

If it is determined in step 356 that the data structure in memory includes a record associated with the calling routine, Omethod1, then control passes to step 360. In step 360, data stored in the record is retrieved.

In step 362, the data indicating the number of times the routine Omethod1 is completed, stored in field 388, is incremented by one. For example, if the data in field 388 indicates Omethod1 has been completed 7 times, the data is changed to indicate 8 times. Also in step 362, the DataOnExit routine computes the difference with the number of times the routine Omethod1 is called, stored in field 384, to yield the number of active calls. Data indicating the number of active calls is stored in field 390. For example, if the number of times Omethod1 is called is 11 and the number of times Omethod1 completed is 8, the number of active calls is 3.

In step 364, the data indicating the end time, stored in field 389, is set to indicate the time determined in step 354. For example, data in field 389 is set to indicate 1.222 seconds.

Also in step 364, the DataOnExit routine computes the difference with the earliest start time, stored in field 386, to yield the execution time. Data indicating the execution time is stored in field 392. For example, if the earliest start time is 0.555 seconds and the end time is 1.222 seconds, the execution time is 0.667 seconds. After the execution time is computed, the start time used in the computation is removed from the array of start times indicated by the data stored in field 386.

In step 368, the DataOnExit routine computes statistics of execution time including an average execution time, a maximum execution time, and a minimum execution time, and stores the results in fields 394, 396, 398, respectively. The average execution time is computed, for example, by adding the execution time to the product of the average execution time already stored in field 394 and the number of times completed in field 388 (before field 388 is updated in step 362). The minimum execution time indicated by data stored in field 396 is replaced by the execution time indicated by data stored in field 392 if the execution time is less than the minimum execution time. The maximum execution time indicated by data stored in field 398 is replaced by the execution time indicated by data stored in field 392 if the execution time is greater than the maximum execution time.

During the computation of execution time in step 364, there is no guarantee that the most recently completed call to the particular original routine Omethod1 is the same call as the call with the earliest start time. The resulting value of execution time is still useful for computing an average execution time. However, using the earliest execution time may cause the maximum execution time to be too small (and the minimum execution time to be too large). For example, if the earliest of the active calls to start is the last to end at some later time, assumed to be 1.444 seconds for purposes of illustration, then the execution time is really 0.889 seconds. The average execution time may be the same after the three active calls are completed, but the maximum execution time would depend on 0.889 seconds rather than 0.667 seconds. Similarly, if the latest start time in the fourth element of the start time array, at 1.111 seconds, is associated with the currently exiting call to Omethod1, the execution time for the current call to Omethod1 is really 0.111 seconds. The minimum execution time would depend on 0.111 seconds rather than 0.667 seconds.

Therefore, in some embodiments, the latest start time in the array of start times is used in the computation of execution time to ensure that the maximum execution time stored is greater than or equal to the actual maximum and that the minimum execution time stored is less than or equal to the actual minimum.

In still other embodiments, only the last start time is indicated by the data stored in field 386, rather than an array, and that lone start time is used to compute execution time. Execution times computed with the last start time are smaller than the actual execution time, if there is more than one active call. Therefore the stored value for the maximum execution time is less than or equal to the actual maximum execution time. Such an underestimated value of maximum execution time is often still useful for detecting a problem in an original routine such as Omethod1.

In step 370 data indicating other information related to performance measurement is determined and stored in record 380 associated with the original calling routine Omethod1.

In step 372, it is determined whether it is time to report performance data for the measurement database 196 based on a predetermined schedule for reporting performance data and the current time determined in step 354. For example, the predetermined schedule indicates performance data are to be reported every hour.

If it is not time to report performance, then control passes to step 379. If it is time to report performance, then control passes to step 374.

In step 374, the performance data are reported to a process for storing the data in the measurement database 196. For example, records 380 are removed from the data structure in memory and sent to servlet 104. By removing records from the data structure, the next call to an original method that invokes DataOnEntry will cause the fields to be reset and a new record to be created. In some embodiments, the data in records 380 that indicate active calls are reset to remove references to completed calls, but the record is not removed. For example, the data indicating the number of times called in field 384 is reset to data indicating the number of active calls in field 390, and the number of completed calls and the execution time are reset to zero.

According to the embodiment illustrated in FIG. 1B, the data from records 380 are sent to the servlet 104; and, the servlet 104 sends the data to the log measurements process 193. The log measurements process 193 is configured to store, into measurements database 196, information based on the data received from servlet 104.

In step 379, the second modification routine, DataOnExit, returns control to the original calling routine, Omethod1, which promptly returns control to the original routine that called Omethod1, or ends the application.

Tool for Inserting New Behavior Into Compiled Application

Steps performed by a tool for instrumenting particular routines of a compiled application, are illustrated with example original compiled code and an example control file presented in Table 1 and Table 2, respectively.

Example Original Compiled Code

To illustrate the operation of tool 115, consider original compiled code 106 represented by the statements in Table 1. Table 1 provides sample statements suggesting types of bytecode instructions used in a component of an original application. In Tables 1 and 2, routines are called methods, following the terms used in bytecode. Ellipses are inserted in the tables to indicate statements or portions of statements that are not presented in order to avoid cluttering the description with details that are not relevant to understanding the embodiments.

TABLE 1

Sample statements in an original application.

| Line Number | Sample Statement |
|---|---|
| 1 | class shopping_cart |
| 2 | ... |
| 3 | Omethod1( ) |
| 4 | ... |
| 5 | y = Omethod2( ... ) |
| 6 | ... |
| 7 | z = Omethod3( ... ) |
| 8 | ... |
| 9 | return |
| 10 | endOmethod1 |
| 11 | Omethod2( ) |
| 12 | ... |
| 13 | a = Omethod ( ... ) |
| 14 | if (a = 0) return |
| 15 | ... |
| 16 | return |
| 17 | end Omethod2 |
| 18 | Omethod3( ) |
| 19 | ... |
| 20 | return |
| 21 | end Omethod3 |
| 22 | Omethod4( ) |
| 23 | ... |
| 24 | return |
| 25 | end Omethod4 |
| 26 | end class shopping cart |

The statements in lines 1 and 26 indicate that the intervening statements define a shopping_cart component.

After some statements indicated by the ellipsis in line 2, the statement in line 3 indicates the start of a first original routine, Omethod1, in the shopping_cart component. Several statements are included in the definition of Omethod1, including statements indicated by ellipses 4, 6, 9. The statement at line 5 indicates that a variable, y, is assigned a value based on invoking another original method Omethod2. The statement at line 7 indicates that a variable, z, is assigned a value based on invoking another original method Omethod3. The return statement in line 9 is an exit point of the routine Omethod1 that returns control to whatever routine of another component called Omethod1. The statement in line 10 indicates the end of the definition of the routine Omethod1.

The statement in line 11 indicates the start of a second original routine, Omethod2, in the shopping_cart component. Several statements are included in the definition of Omethod2, including statements indicated by ellipses in lines 12, 15. The statement at line 13 indicates that a variable, a, is assigned a value based on invoking another original method Omethod4. The statement at line 14 indicates that a return is made to the routine that called Omethod2 if the value assigned to variable a is zero. Line 14 represents a conditional exit point of the routine Omethod2; under some conditions, Omethod2 completes and exits based on the statement in line 14. The return statement in line 16 is another exit point of the routine Omethod2. The return statements in lines 14 and 16 each returns control to whatever routine called Omethod2. For example, the return statements in lines 14 and 16 each returns control to Omethod1 immediately after line 5. The statement in line 17 indicates the end of the definition of the routine Omethod2.

The statement in line 18 indicates the start of a third original routine, Omethod3, in the shopping_cart component. Several statements are included in the definition of Omethod3, including statements indicated by the ellipsis in line 19. The return statement in line 20 is an exit point of the routine Omethod3 that returns control to whatever routine called Omethod3. For example, the return statement in line 20 returns control to Omethod1 immediately after line 7. The statement in line 21 indicates the end of the definition of the routine Omethod3.

The statement in line 22 indicates the start of a fourth original routine, Omethod4, in the shopping_cart component. Several statements are included in the definition of Omethod4, including statements indicated by the ellipsis in line 23. The return statement in line 24 is an exit point of the routine Omethod4 that returns control to whatever routine called Omethod4. For example, the return statement in line 20 returns control to Omethod2 immediately after line 13. The statement in line 25 indicates the end of the definition of the routine Omethod4.

Example Control File

To further illustrate the operation of tool 115, consider control file 112 represented by the XML statements in Table 2. The XML statements list the original routines to have instructions inserted that invoke modification routines with new behavior.

TABLE 2

Sample XML statements in a control file.

Line Number Sample Statement

| 1 | ... |
|---|---|
| 2 | <instrument> |
| 3 |    <class name = retail_cart_and_pay.shopping_cart"> |
| 4 |       <method name = "Omethod1" . . .> |
| 5 |          <before>Logger.DataOnEnter </before> |
| 6 |          <after>Logger.DataOnExit </after> |
| 7 |       </method> |
| 8 |       <method name = "*2" . . . |
| 9 |          <before> . . . </before> |
| 10 |          <after> . . . </after> |
| 11 |       </method> |
| 12 |    </class> |
| 13 |    <class name = "retail_cart_and_pay.payment"> |
| 14 |       <method name = "*" . . . |
| 15 |          <before> . . . </before> |
| 16 |          <after> . . . </after> |

TABLE 2-continued

Sample XML statements in a control file.

Line Number Sample Statement

| 17 |       </method> |
|---|---|
| 18 |    </class> |
| 19 | </instrument> |

After some statements indicated by the ellipsis in line 1, the XML statements in lines 2 and 19, using the start tag <instrument> and the end tag <instrument>, indicate that the intervening statements describe the new behavior (the "instrument") to be associated with a particular original application. The XML statement in line 3 indicates the original application is identified by the name before the period, "retail_cart_and_pay." The XML statements in lines 3 and 12, using the start tag <class> and the end tag <class>, indicate that the intervening statements describe one original component of the original application. The XML statement in line 3 indicates the original component is identified by the name after the period, "shopping_cart," and is part of the application "retail_cart_and_pay."

The XML statements in lines 4 and 11, using the start tag <method> and end tag </method>, indicate that the intervening statements describe original routines (methods) of the original component. The XML statement in line 4 indicates the original routine is identified by the name "Omethod1." The ellipsis in line 4, as well as the ellipses in lines 8 and 14, represent other attributes of the corresponding XML statements that are not relevant to the illustrated embodiment.

The XML statement in line 5, using the start tag <before> and end tag </before>, indicate that this statement describes a modification routine to be invoked in the instructions inserted into the beginning of the original routine. The <before> tag in line 5 indicates the name of the modification routine is "DataOnEnter" of the package "Logger" and that the modification routine is associated with a statement "before" performing the steps of the old routine. The XML statement in line 6, using the start tag <after> and end tag <after>, indicate that this statement describes a modification routine to be invoked in the instructions inserted into the end of the original routine. The <after> tag in line 6 indicates the name of the modification routine is "DataOnExit" of the package "Logger" and that the modification routine is associated with a statement "after" performing the steps of the old routine.

The XML statements in lines 8 and 11, using the start tag <method> and end tag </method>, indicate that the next set of intervening statements describe another original routine. The XML statement in line 8 indicates the original routine is identified by the name "*2" where the asterisk is a wildcard symbol that indicates any number of characters. Thus "*2" indicates any original routine with a name ending in the numeral 2. Using wildcards, multiple original routines can be indicated by one pair of open and close tags, <method>, </method>, respectively. In the case of the original code represented by Table 1, the only routine ending in the numeral "2" is the routine Omethod2.

The characters and ellipses in lines 9 and 10 are herein used to represent the same XML statements as listed above in lines 5 and 6, to avoid making Table 2 too long and cumbersome. The XML statements in lines 5 and 6 indicate that the modification routine "DataOnEnter" is invoked in statements inserted in association with a statement to enter the original routine, and the modification routine "DataOnExit" is invoked in statements inserted in association with a statement to exit the original routine.

The XML statements in lines 13 and 18, using the start tag <class> and the end tag <class>, indicate that the intervening statements describe a second original component of the original application. The XML statement in line 13 indicates the original component is identified by the name after the period, "payment," and is part of the application "retail_cart_and pay."

The XML statements in lines 14 and 17, using the start tag <method> and end tag </method>, indicate that the next set of intervening statements describe original routines in the second original component. The XML statement in line 14 indicates the original routine is identified by the name "*" where the asterisk is a wildcard symbol that indicates any number of characters. Thus "*" indicates every original routine in the component.

The characters and ellipses in lines 15 and 16 are herein used to represent the same XML statements as listed above in lines 5 and 6, to avoid making Table 2 too long and cumbersome. The XML statements in lines 5 and 6 indicate that the modification routine "DataOnEnter" is invoked in statements inserted in association with a statement to enter the old routine, and the modification routine "DataOnExit" is invoked in statements inserted in association with a statement to exit the original routine.

The control file represented by the XML statements in Table 2 indicates that all the routines in the payment component, and the routine Omethod1 and routines ending in the numeral 2 in the shopping_cart component, have instructions inserted to invoke the modification routines DataOnEnter and DataOnExit to measure performance.

In another embodiment, the tool 115 is especially configured for performance measurements and automatically associates DataOnEnter with the first statement in every original routine listed, and automatically associates the DataOnExit routine with the exit points in every original routine listed. In such an embodiment, only the original routines are listed in an XML file control 112. The statements in lines 5–6 repeated at lines 9–10 and at lines 15–16 are omitted.

Instrumentation of Compiled Code

Figure 4:
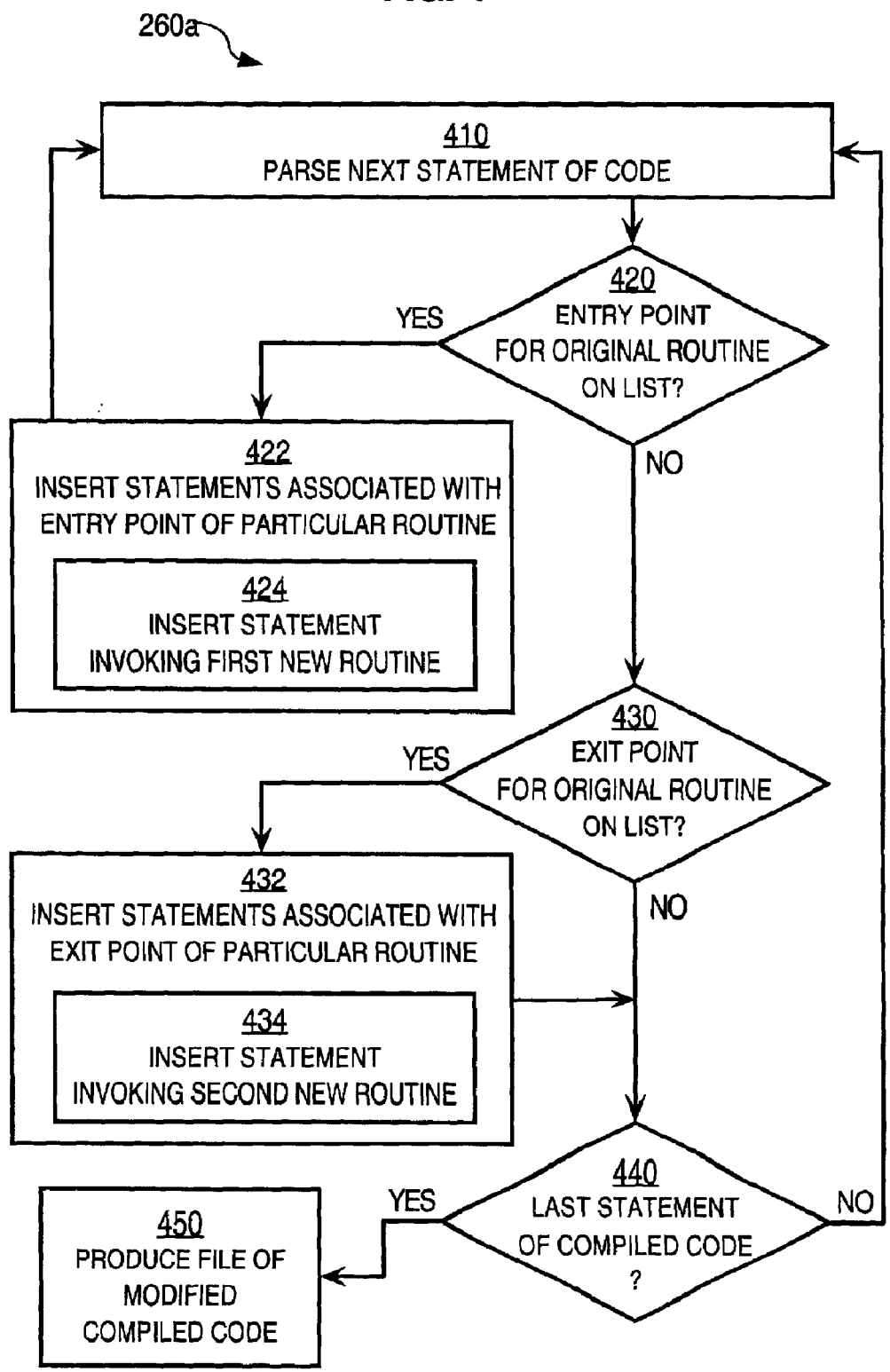
FIG. 4 is a flowchart illustrating a method performed by a tool for instrumenting particular routines of a compiled application, according to an embodiment.

FIG. 4 is a flowchart illustrating steps performed by a tool for instrumenting particular routines of a compiled application, according to an embodiment 260a of step 260 in FIG. 2. The steps are illustrated using the example original compiled code represented in Table 1 and the example control file in Table 2.

In step 410, the tool parses the next statement of the original compiled code. For example, the tool parses the statement "class shopping_cart" in line 1 to determine that the next statements belong to the shopping cart component. The tool also parses the statement "Omethod1( )" in line 3 of Table 1.

In step 420, the tool determines whether the statement represents the entry point for an original routine listed in the control file. If not, control passes to step 430 to determine whether the statement is an exit point of a listed original routine. For example, the tool determines whether the statement "class shopping_cart" is an entry point of an original routine listed in the XML control file of Table 2. Since the statement is not an entry point for a routine, control passes to step 430 to determine whether the statement is an exit point.

If it is determined in step 420 that the statement is an entry point for a listed original routine, then control passes to step 422 to insert statements associated with an entry point.

For example, the tool determines whether the statement "Omethod1 ( )" in line 3 of Table 1 is an entry point of an original routine listed in the XML control filed of Table 2. The statement is an entry point for the routine "Omethod1" of the shopping_cart component, and the routine "Omethod1" of component "shopping_cart" is a particular routine listed in the XML control file in Table 2 at line 7. Therefore control passes to step 422.

In step 422, statements associated with an entry point of the particular routine are inserted. In one embodiment, step 422 includes step 424 for inserting a statement invoking the first modification routine. For example, according to line 8 of the control file, the bytecode associated with the entry point of the particular routine Omethod1 invokes the modification routine DataOnEnter. It is assumed that DataOnEnter returns a value of one if the routine functions successfully and returns a value of zero if an error occurs. The bytecode inserted invokes the routine and continues if no error occurs, but throws an error if an error occurs in the modification routine. The embodiment illustrated passes the name of the calling routine and the current time as parameters. Such bytecode is suggested by the statements presented in Table 3.

TABLE 3

Sample statements inserted at an entry point to an original routine.

| Line Number | Sample Statement |
| --- | --- |
| 1 | t = current_time |
| 2 | if (DataOnEnter ("Omethod1", t) = 0) throw error |

In another embodiment, other statements may be included. For example, the behavior of an original routine can be replaced by the new behavior of the modification routine by including a conditional statement that returns out of the original routine if the modification routine completes without an error. If the modification routine is named ReplacementBehavior and takes as an argument the name of the calling routine, the single conditional statement is inserted:

if (ReplacementBehavior("Omethod1")=1) return.

After inserting the statements associated with the entry point, control passes back to step 410 to parse the next statement.

In step 430, the tool determines whether the statement represents the exit point for an original routine listed in the control file. If not, control passes to step 440 to determine whether another statement remains to be parsed in the original compiled code. For example, the tool determines whether the statement "Omethod1 ( )" in line 3 of Table 1 is an exit point of an original routine listed in the XML control file of Table 2. Since the statement is not an exit point for a routine, control passes to step 440 to determine whether another statement remains to be parsed.

If it is determined in step 430 that the statement is an exit point for a listed original routine, then control passes to step 432 to insert statements to invoke a modification routine. For example, the tool determines whether the statement "if a =0, return" in line 14 of Table 1 is an exit point of an original routine listed in the XML control filed of Table 2. The statement is an exit point for the routine "Omethod2" of the shopping_cart component, and the routine "Omethod2" of component "shopping_cart" is a particular routine listed in the XML control file in Table 2 at line 8, by virtue of the designation "*2" including the wildcard character asterisk. Therefore control passes to step 432.

In step 432 statements associated with an exit point of the particular routine are inserted. In one embodiment, step 432 includes step 434 for inserting a statement invoking the second modification routine. For example, according to line 6 of the control file (repeated at the ellipses in line 10 for the routines named "*2") the bytecode associated with the exit point of the particular routine *2, including Omethod2, invokes the modification routine DataOnExit. It is assumed that DataOnExit returns a value of one if the routine functions successfully and returns a value of zero if an error occurs. The bytecode inserted invokes the routine and continues if no error occurs, but throws an error if an error occurs in the modification routine. The embodiment illustrated passes the name of the calling routine and the current time as parameters. Such bytecode is suggested by the statements presented in Table 3.

TABLE 4

Sample statements inserted at an exit point to an original routine.

| Line Number | Sample Statement |
|---|---|
| 1 | if(a = 0) |
| 2 | {t = current_time; |
| 3 | if (DataOnExit ("Omethod1", t) = 0) throw error} |

In another embodiment other statements may be included. After inserting the statements associated with the exit point, control passes to step 440.

In step 440, it is determined whether there is another statement to parse in the original compiled code. If so, control passes back to step 410 to parse the next statement in the original compiled code. For example, after parsing the bytecode suggested by the statement at line 14 of Table 1, control passes to step 410 to parse the bytecode suggested by the ellipsis at line 15.

If it is determined in step 440 that there is not another statement to parse in the original compiled code, then control passes to step 450. In step 450 a file is produced containing the modified compiled code. For example, a Java class file is produced with bytecode suggested by the statements in Table 5. Fractional line numbers are used for the inserted lines to make comparison with Table 1 easier.

TABLE 5

Sample statements in modified compiled code.

| Line Number | Sample Statement |
|---|---|
| 1 | class shopping_cart |
| 2 | ... |
| 3 | Omethod1( ) |
| 3.1 | t = current_time |
| 3.2 | if (DataOnEnter ("Omethod1", t) = 0) throw error |
| 4 | ... |
| 5 | y = Omethod2( ... ) |
| 6 | ... |
| 7 | z = Omethod3( ... ) |
| 8 | ... |
| 8.1 | t = current_time |
| 8.2 | if (DataOnExit ("Omethod1", t) = 0) throw error |
| 9 | return |
| 10 | end Omethod1 |
| 11 | Omethod2( ) |
| 11.1 | t = current_time |
| 11.2 | if (DataOnEnter ("Omethod2", t) = 0) throw error |
| 12 | ... |
| 13 | a = Omethod4( ... ) |
| 13.1 | if (a = 0) |
| 13.2 | {t = current_time; |
| 13.3 | if (DataOnExit ("Omethod1", t) = 0) throw error} |
| 14 | if (a = 0) return |
| 15 | ... |
| 15.1 | t = current_time |
| 15.2 | if (DataOnExit ("Omethod2", t) = 0) throw error |
| 16 | return |
| 17 | end Omethod2 |
| 18 | Omethod3( ) |
| 19 | ... |
| 20 | return |
| 21 | end Omethod3 |
| 22 | Omethod4( ) |
| 23 | ... |
| 24 | return |
| 25 | end Omethod4 |
| 26 | end class shopping_cart |

The bytecode suggested by the statements in Table 5 include statements inserted after the entry point and before the exit points of Omethod1 and Omethod2. No statements were inserted for Omethod3 and Omethod4 because those original routines are nowhere listed in the XML control file of Table 2. The bytecode suggested by Table 5 is automatically generated based on the original bytecode in Table 1, the XML control file in Table 2, and the steps in the flowchart of FIG. 4.

When a runtime module is produced and executed, each call to one of the routines Omethod1 and Omethod2 causes the new method DataOnEnter to be invoked immediately upon entering the routine Omethod1 or Omethod2 and causes the new method DataOnExit to be invoked immediately before returning from the routine Omethod1 or Omethod2. Data related to performance is accumulated in the data structure 128 in memory by the modification routines. One record in the data structure is associated with the method Omethod1, and a second record is associated with Omethod2. Other records in the data structure are associated with the routines in the property component. Table 6 shows sample data in the data structure for the two records associated with routines Omethod1 and Omethod2 after 59 minutes, according to one embodiment.

TABLE 6

Sample data in the data structure in memory at 59 minutes.

| Field | First Record | Second Record |
|---|---|---|
| Name of calling routine | Omethod1 | Omethod2 |
| Number of times called | 157 | 140 |
| Start times | 3507.111, 3510.010 | 3507.112 |
| Number of times completed | 155 | 140 |
| End time | 3414.1414 | 3414. |
| Number of active calls | 1 | 0 |
| Execution time | 0.667 | 1.595 |
| Average execution time | 0.543 | 12.622 |
| Minimum execution time | 0.111 | 1.595 |
| Maximum execution time | 0.987 | 112.012 |

According to a predetermined schedule, after the next minute, when one hour is up, for example, the information in Table 6 is sent to the log measurements process 121 through servlet 104. The log measurements process 121 stores the information in the measurements database 196.

The data in the data structure 128 in memory is reset and another one-hour sampling interval begins.

At some later time, the performance analysis and response processes 194 operates on this information. Any problems are identified for further action. For example, the long execution times of routine Omethod2, including a maximum execution time that is about a hundredfold greater than maximum execution times of other routines, may indicate a problem with original routine Omethod2 provided by a third party.

As shown by this example, these techniques allow an administrator to automatically instrument compiled code of an application or to provide new behavior for the application, without taking the application offline for substantial periods of time. In particular, the techniques allow a website administrator of a web service provider to automatically instrument existing applications, components, and subcomponents to measure and respond to server-side performance without taking the applications offline.

Hardware Overview

Figure 5:
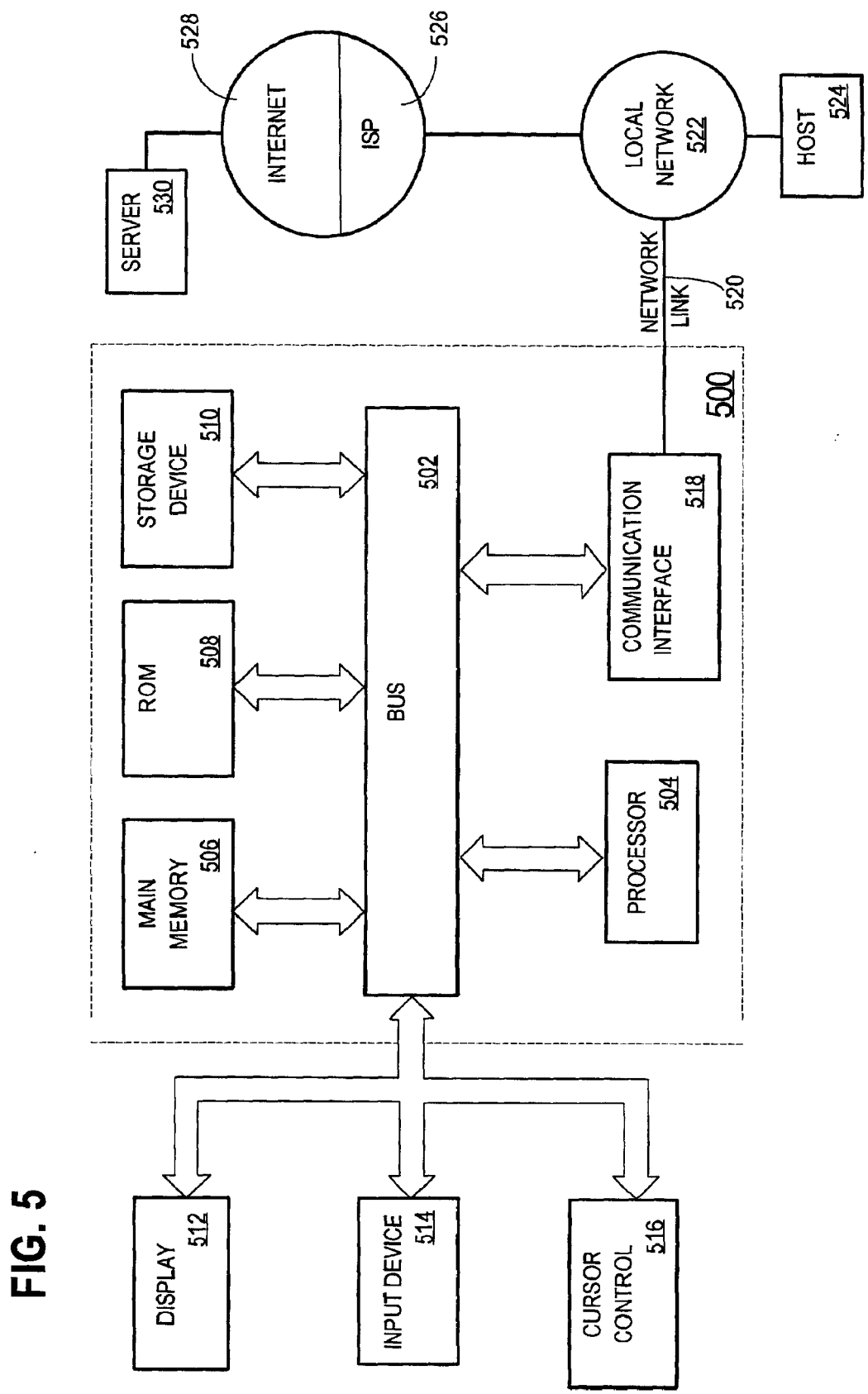
FIG. 5 is a block diagram that illustrates a computer system upon which an embodiment of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which a processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for automatically modifying behavior of a compiled application, the method comprising the computer implemented steps of:

receiving a first set of compiled instructions for the application;

modifying the first set of compiled instructions to generate a modified set of compiled instructions, including the step of inserting into said first set of compiled instructions a new set of one or more instructions for invoking a modification routine that provides new behavior;

wherein the modification routine is not part of the first set of compiled instructions;

wherein the method further comprises the step of parsing the first set of compiled instructions to identify an entry point to a target routine that exists in the first set of compiled instructions; and said step of inserting includes inserting the new set of one or more instructions at a location in the first set of compiled instructions that is based on where the entry point to the target routine resides in the first set of instructions.

2. The method of claim 1, said step of inserting further comprising inserting the new set of one or more instructions at a location within the first set of instructions that causes the new set of one or more instructions to be executed immediately after the target routine is invoked.

3. The method of claim 1, wherein:

the new set of one or more instructions constitutes a first new set of one or more instructions; and the method further comprising the steps of:

parsing the first set of compiled instructions to identify an exit point to the target routine; and inserting a second new set of one or more instructions at a location in the first set of compiled instructions that is based on where an exit point to the target routine resides in the first set of instructions.

4. The method of claim 3, wherein the modification routine stores a first time value in response to being invoked through the first new set of one or more instructions; and the second new set of one or more instructions invokes a second modification routine for storing a second time value.

5. The method of claim 4, wherein the modification routine is the same as the second modification routine.

6. The method of claim 4, comprising the step of measuring performance of the target routine based on a comparison between the first time value and the second time value.

7. The method of claim 6, wherein the second modification routine performs said step of measuring performance of the target routine.

8. The method of claim 1, wherein the new set of one or more instructions are inserted at each location where, within said first set of instructions, resides an entry point into one of the routines in the first set.

9. The method of claim 8, wherein:

the new set of one or more instructions constitutes a first new set of one or more, instructions;

the method further comprises the step of inserting a second new set of one or more instructions for every one of the routines in the first set of compiled instructions; and the second new set of one or more instructions are inserted at each location in the first set of compiled instructions where, within said first set of instructions, resides an exit point from one of the routines in the first set.

10. The method of claim 9, wherein the modification routine stores a first time value in response to being invoked through the first new set of one or more instructions; and the second new set of one or more instructions invokes a second modification routine for storing a second time value.

11. A method for automatically modifying behavior of a compiled application, the method comprising the computer implemented steps of:

receiving a first set of compiled instructions for the application;

modifying the first set of compiled instructions to generate a modified set of compiled instructions, including the step of inserting into said first set of compiled; instructions a new set of one or more instructions for invoking a modification routine that provides new behavior;

wherein the modification routine is not part of the first set of compiled instructions;

wherein the new set of one or more instructions are inserted at a location based on where, within said first set of instructions, resides a particular instruction that is associated with entering a target routine in the first set.

12. The method of claim 11, wherein the one or more instructions cause one or more functions provided by said target routine to be bypassed.

13. A method for automatically modifying behavior of a compiled application, the method comprising the computer implemented steps of:

receiving a first set of compiled instructions for the application;

modifying the first set of compiled instructions to generate a modified set of compiled instructions, including the step of inserting into said first set of compiled instructions a new set of one or more instructions for invoking a modification routine that provides new behavior:

wherein the modification routine is not part of the first set of compiled instructions;

wherein the new set of one or more instructions are inserted at a location based on where, within said first set of instructions, resides a particular instruction that is associated with exiting a target routine in the first set.

14. A method for automatically modifying behavior of a compiled application, the method comprising the computer implemented steps of:

receiving a first set of compiled instructions for the application modifying the first set of compiled instructions to generate a modified set of compiled instructions, including the step of inserting into said first set of compiled instructions a new set of one or more instructions for invoking a modification routine that provides new behavior;

wherein the modification routine is not part of the first set of compiled instructions;

wherein said step of invoking the modification routine comprises invoking a routine that accumulates data about performance of the application.

15. The method of claim 14, wherein the data about performance includes data indicating a number of times a particular set of instructions within said first set of compiled instructions is executed.

16. The method of claim 14, wherein the modification routine reports data about performance of the application to a process, other than the application, that is executing on a network.

17. A method for automatically monitoring performance of a compiled application, the method comprising the computer implemented steps of:

receiving a first set of compiled instructions for the application; and generating a modified set of compiled instructions, including:

inserting a first set of one or more instructions for invoking a modification routine in association with entering a particular routine within the first set of compiled instructions; and inserting a second set of one or more instructions that invoke a second modification routine in association with exiting the particular routine;

wherein the modified set of compiled instructions causes a processor to perform the steps of:

invoking the modification routine when entering the particular routine; and invoking the second modification routine when exiting the particular routine.

18. The method of claim 17, further comprising executing a runtime module based on the modified set of compiled instructions.

19. The method of claim 17, said step of invoking the modification routine comprising accumulating first data associated with the particular routine, the first data indicating at least one of a number of times the particular routine is called and a start time for the particular routine.

20. The method of claim 19, said step of invoking the second modification routine comprising accumulating second data associated with the particular routine, the second data indicating at least one of a number of times the particular routine has completed, a number of active calls to the particular routine that have not completed, an end time for the particular routine, an execution time based on a difference between the start time and the end time, an average execution time, a minimum execution time, and a maximum execution time.

21. The method of claim 17, said step of invoking the second modification routine comprising recording data about performance associated with the particular routine.

22. The method of claim 21, wherein said step of recording data about performance is performed according to a particular schedule based on a time when the second modification routine is invoked.

23. The method of claim 17, further comprising the step of receiving first data indicating the particular routine.

24. The method of claim 17, wherein:

the method further comprises receiving first data indicating a plurality of particular routines in the first set; and said steps of inserting a first set and inserting a second set are repeated for each particular routine of the plurality of particular routines.

25. The method of claim 17, said step of invoking the second modification routine comprises reporting data about performance of the application to a process, other than the application, that is executing on a network.

26. The method of claim 17, wherein the application provides a service in response to a request from a client process on a network.

27. The method of claim 17, wherein the first set of compiled instructions comprises bytecode.

28. A method for automatically monitoring performance of a compiled application, the method comprising the computer implemented steps of:

receiving a first set of compiled instructions for the application;

receiving first data indicating a plurality of particular routines in the first set;

generating a modified set of compiled instructions, including:

inserting, for each particular routine of the plurality of particular routines, a first set of one or more instructions for invoking a modification routine in association with entering the particular routine within the first set of compiled instructions; and inserting, for each particular routine of the plurality of particular routines, a second set of one or more instructions that invoke a second modification routine in association with exiting the particular routine; and executing a runtime module based on the modified set of compiled instructions to cause a processor to perform the steps of:

invoking the modification routine when entering the particular routine for accumulating first data associated with the particular routine, the first data indicating at least one of a number of times the particular routine is called and a start time for the particular routine; and invoking the second modification routine when exiting the particular routine for accumulating second data associated with the particular routine, the second data indicating at least one of a number of times the particular routine has completed, a number of active calls to the particular routine that have not completed, an end time for the particular routine, an execution time based on a difference between the start time and the end time, an average execution time, a minimum execution time, and a maximum execution time, and recording data about performance based on the first data and the second data according to a particular schedule based on a time when the second modification routine is invoked.

29. A computer-readable medium carrying one or more sequences of instructions for automatically modifying behavior of a compiled application, wherein execution of the one or more sequences of instructions by one or more processors causes the one or more processors to perform the steps of:

receiving a first set of compiled instructions for the application;

modifying the first set of compiled instructions to generate a modified set of compiled instructions, including the step of inserting a new set of one or more instructions for invoking a modification routine that provides new behavior;

wherein the modification routine is not part of the first set of compiled instructions;

wherein execution of the one or more sequences of instructions by one or more processors causes the one or more processors to further perform the step of parsing the first set of compiled instructions to identify an entry point to a target routine that exists in the first set of compiled instructions; and said step of inserting includes inserting the new set of one or more instructions at a location in the first set of compiled instructions that is based on where the entry point to the target routine resides in the first set of instructions.

30. The computer-readable medium of claim 29, said step of inserting further comprising inserting the new set of one or more instructions at a location within the first set of instructions that causes the new set of one or more instructions to be executed immediately after the target routine is invoked.

31. The computer-readable medium of claim 29, wherein:

the new set of one or more instructions constitutes a first new set of one or more instructions; and execution of the one or more sequences of instructions by one or more processors causes the one or more processors to further perform the steps of:

parsing the first set of compiled instructions to identify an exit point to the target routine; and inserting a second new set of one or more instructions at a location in the first set of compiled instructions that is based on where an exit point to the target routine resides in the first set of instructions.

32. The computer-readable medium of claim 31, wherein the modification routine stores a first time value in response to being invoked through the first new set of one or more instructions; and the second new set of one or more instructions invokes a second modification routine for storing a second time value.

33. The computer-readable medium of claim 32, wherein the modification routine is the same as the second modification routine.

34. The computer-readable medium of claim 32, wherein execution of the one or more sequences of instructions by one or more processors causes the one or more processors to further perform the step of measuring performance of the target routine based on a comparison between the first time value and the second time value.

35. The computer-readable medium of claim 34, wherein the second modification routine performs said step of measuring performance of the target routine.

36. The computer-readable medium of claim 29, wherein the new set of one or more instructions are inserted at each location where, within said first set of instructions, resides an entry point into one of the routines in the first set.

37. The computer-readable medium of claim 36, wherein:

the new set of one or more instructions constitutes a first new set of one or more instructions;

execution of the one or more sequences of instructions by one or more processors further causes the one or more processors to perform the step of inserting a second new set of one or more instructions for every one of the routines in the first set of compiled instructions; and the second new set of one or more instructions are inserted at each location in the first set of compiled instructions where, within said first set of instructions, resides an exit point from one of the routines in the first set.

38. The computer-readable medium of claim 37, wherein the modification routine stores a first time value in response to being invoked through the first new set of one or more instructions; and the second new set of one or more instructions invokes a second modification routine routine for storing a second time value.

39. A computer-readable medium carrying one or more sequences of instructions for automatically modifying behavior of a compiled application, wherein execution of the one or more sequences of instructions by one or more processors causes the one or more processors to perform the steps of:

receiving a first set of compiled instructions for the application modifying the first set of compiled instructions to generate a modified set of compiled instructions, including the step of inserting a new set of one or more instructions for invoking a modification routine that provides new behavior;

wherein the modification routine is not part of the first set of compiled instructions;

wherein the new set of one or more instructions are inserted at a location based on where, within said first set of instructions, resides a particular instruction that is associated with entering a target routine in the first set.

40. The computer-readable medium of claim 39, wherein the one or more instructions cause one or more functions provided by said target routine to be bypassed.

41. A computer-readable medium carrying one or more sequences of instructions for automatically modifying behavior of a compiled application, wherein execution of the one or more sequences of instructions by one or more processors causes the one or more processors to perform the steps of:

receiving a first set of compiled instructions for the application;

modifying the first set of compiled instructions to generate a modified set of compiled instructions, including the step of inserting a new set of one or more instructions for invoking a modification routine that provides new behavior;

wherein the modification routine is not part of the first set of compiled instructions;

wherein the new set of one or more instructions are inserted at a location based on where, within said first set of instructions, resides a particular instruction that is associated with exiting a target routine in the first set.

42. A computer-readable medium carrying one or more sequences of instructions for automatically modifying behavior of a compiled application, wherein execution of the one or more sequences of instructions by one or more processors causes the one or more processors to perform the steps of:

receiving a first set of compiled instructions for the application;

modifying the first set of compiled instructions to generate a modified set of compiled instructions, including the step of inserting a new set of one or more instructions for invoking a modification routine that provides new behavior;

wherein the modification routine is not part of the first set of compiled instructions;

wherein said step of invoking the modification routine comprises invoking a routine that accumulates data about performance of the application.

43. The computer-readable medium of claim 42, wherein the data about performance includes data indicating a number of times a particular set of instructions within said first set of compiled instructions is executed.

44. The computer-readable medium of claim 42, wherein the modification routine reports data about performance of the application to a process, other than the application, executing on a network.

45. A computer-readable medium carrying one or more sequences of instructions for automatically monitoring performance of a compiled application, wherein execution of the one or more sequences of instructions by one or more processors causes the one or more processors to perform the steps of:

receiving a first set of compiled instructions for the application; and generating a modified set of compiled instructions, including:

inserting a first set of one or more instructions for invoking a modification routine in association with entering a particular routine within the first set of compiled instructions; and inserting a second set of one or more instructions that invoke a second modification routine in association with exiting the particular routine;

wherein the modified set of compiled instructions causes a processor to perform the steps of:

invoking the modification routine when entering the particular routine; and invoking the second modification routine when exiting the particular routine.

46. The computer-readable medium of claim 45, wherein execution of the, one or more sequences of instructions by one or more processors further causes the one or more processors to perform the step of executing a runtime module based on the modified set of compiled instructions.

47. The computer-readable medium of claim 45, said step of invoking the modification routine comprising accumulating first data associated with the particular routine, the first data indicating at least one of a number of times the particular routine is called and a start time for the particular routine.

48. The computer-readable medium of claim 47, said step of invoking the second modification routine comprising accumulating second data associated with the particular routine, the second data indicating at least one of a number of times the particular routine has completed, a number of active calls to the particular routine that have not completed, an end time for the particular routine, an execution time based on a difference between the start time and the end time, an average execution time, a minimum execution time, and a maximum execution time.

49. The computer-readable medium of claim 45, said step of invoking the second modification routine comprising recording data about performance associated with the particular routine.

50. The computer-readable medium of claim 49, wherein said step of recording data about performance is performed according to a particular schedule based on a time when the second modification routine is invoked.

51. The computer-readable medium of claim 45, wherein execution of the one or more sequences of instructions by one or more processors further causes the one or more processors to perform the step of receiving first data indicating the particular routine.

52. The computer-readable medium of claim 45, wherein:

execution of the one or more sequences of instructions by one or more processors further causes the one or more processors to perform the step of receiving first data indicating a plurality of particular routines in the first set; and said steps of inserting a first set and inserting a second set are repeated for each particular routine of the plurality of particular routines.

53. The computer-readable medium of claim 45, said step of invoking the second modification routine comprises reporting data about performance of the application to a process, other than the application, that is executing on a network.

54. The computer-readable medium of claim 45, wherein the application provides a service in response to a request from a client process on a network.

55. The computer-readable medium of claim 45, wherein the first set of compiled instructions comprises bytecode.

* * * * *

UNITED STATES PATENT AND TRADEMARK OFFICE
CERTIFICATE OF CORRECTION

PATENT NO. : 6,857,119 B1
DATED : February 15, 2005
INVENTOR(S) : Sachin Desai

It is certified that error appears in the above-identified patent and that said Letters Patent is hereby corrected as shown below:

Column 24,
Line 38, delete "first set of compiled;" and insert -- first set of compiled --.

Column 28,
Line 26, delete "application" and insert -- application; --.

Column 29,
Line 47, delete "of the, one" and insert -- of the one --.

Signed and Sealed this

Twenty-fourth Day of May, 2005

JON W. DUDAS
*Director of the United States Patent and Trademark Office*